J. D. WEAVER.
Whiffletree.
No. 39,692. Patented Aug. 25, 1863.
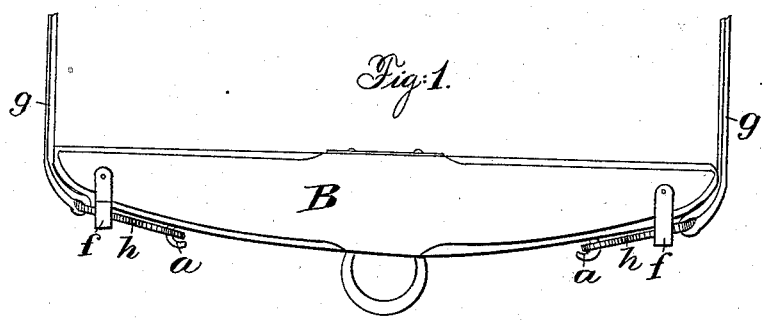
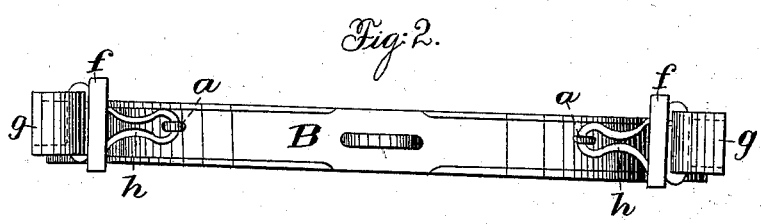
Witnesses  Inventor

UNITED STATES PATENT OFFICE.

J. D. WEAVER, OF PENFIELD, NEW YORK.

IMPROVEMENT IN WHIFFLETREES.

Specification forming part of Letters Patent No. 39,692, dated August 25, 1863.

*To all whom it may concern:*

Be it known that I, J. D. WEAVER, of Penfield, in the county of Monroe and State of New York, have invented a new and useful Whiffletree for Plowing or Cultivating in Nurseries or Orchards; and I do hereby declare that the following is a full, clear, and exact description thereof, reference being had to the accompanying drawings, making a part of this specification, in which—

Figure 1 is a bottom view of the invention. Fig. 2 shows the rear side of the whiffletree inverted.

Similar letters of reference indicate corresponding parts in both figures.

The nature of this invention will be clearly understood by reference to the drawings and specification.

B in the drawings represents a "single whiffletree," which may be made somewhat less than the usual length. It is provided with a guard or clasp, $f$, projecting from the rear side, near each end. The end of the tugs $g$ being put through these clasps before being attached to the hooks $a$ secures their perfect adjustment. The clasps $f$ should be placed far enough from the ends to prevent their striking the tree as the whiffletree passes it. The hooks $a$ should be so arranged as to cause that portion of the cockeye $h$ which is coupled to the tug $g$ to fill the clasp $f$ vertically, thus securing the proper adjustment of the tugs at all times.

In cultivating orchards or nurseries it has always been found impossible to plow either with a single or double team as close to the trees as is desirable with whiffletrees as ordinarily constructed, without great injury to them by bruising and knocking off the bark. Even when the greatest precaution is exercised some trees will receive fatal injury in this way. To avoid this I had previous to producing this invention padded the ends of the whiffletrees and the cockeyes; but the great objection to that plan was not only the trouble of applying and removing the pads every time the team was attached or detached, but also their liability to get torn loose and lost off; but these difficulties are all fully met in the construction of the whiffletree and the manner of connecting the tugs herein described. The latter, acting as a sort of fender or pad, has proved entirely efficient in preventing the end of the whiffletree from "barking" or even "rossing" the trees.

These whiffletrees are perfectly adapted to general use, as well as to plowing and cultivating.

What I claim as my invention, and desire to secure by Letters Patent, is—

The construction of whiffletrees and the attachment of the tugs $g$ thereto, substantially in the manner and for the purposes herein set forth.

J. D. WEAVER.

Witnesses:
WM. S. LOUGHBOROUGH,
E. W. BRYAN.